United States Patent
Zhang et al.

(10) Patent No.: US 12,153,543 B2
(45) Date of Patent: Nov. 26, 2024

(54) DATA-DRIVEN EXECUTION SYSTEM AND EXECUTION METHOD THEREOF

(71) Applicants: Digiwin Software Co., Ltd, Shanghai (CN); DATA SYSTEMS CONSULTING CO., LTD., New Taipei (TW)

(72) Inventors: Tuo Zhang, Shanghai (CN); Xiaoliang Ma, Shanghai (CN); Guoxin Sun, Shanghai (CN)

(73) Assignees: Digiwin Software Co., Ltd, Shanghai (CN); DATA SYSTEMS CONSULTING CO., LTD., New Taipei (TW)

(*) Notice: Subject to any disclaimer, the term of this patent is extended or adjusted under 35 U.S.C. 154(b) by 37 days.

(21) Appl. No.: 18/161,895

(22) Filed: Jan. 31, 2023

(65) Prior Publication Data

US 2024/0184741 A1    Jun. 6, 2024

(30) Foreign Application Priority Data

Dec. 6, 2022   (CN) .......................... 202211554968.X (51) Int. Cl.
*G06F 15/82*    (2006.01)
*G06F 9/48*    (2006.01)

(52) U.S. Cl.
CPC .......... *G06F 15/825* (2013.01); *G06F 9/4881* (2013.01)

(58) Field of Classification Search
CPC ............................ G06F 15/825; G06F 9/4881
See application file for complete search history.

(56) References Cited

U.S. PATENT DOCUMENTS

| | | | |
|---|---|---|---|
| 2007/0162324 A1* | 7/2007 | Suzuki | G06Q 10/06 705/7.26 |
| 2018/0004751 A1* | 1/2018 | Vikhe | G06F 16/248 |
| 2020/0097333 A1* | 3/2020 | Jain | G06F 9/52 |
| 2020/0104162 A1* | 4/2020 | Wu | G06N 3/04 |
| 2020/0242072 A1* | 7/2020 | Liao | G06F 15/7889 |

FOREIGN PATENT DOCUMENTS

GB    2536932 A   * 10/2016   ....... G06F 17/30312

* cited by examiner

*Primary Examiner* — Farley Abad
(74) *Attorney, Agent, or Firm* — JCIPRNET (57) ABSTRACT

A data-driven execution system and an execution method thereof are provided. The data-driven execution system includes a storage device and a processor. The storage device is used for storing multiple modules. The processor is coupled to the storage device and used to execute multiple modules. The processor receives a data processing request. The processor searches a data graph according to the data processing request to obtain at least one task path. The processor generates a recommended plan according to one of the at least one task path.

16 Claims, 9 Drawing Sheets

DATA-DRIVEN EXECUTION SYSTEM AND EXECUTION METHOD THEREOF

CROSS-REFERENCE TO RELATED APPLICATION

This application claims the priority benefit of China application serial no. 202211554968.X, filed on Dec. 6, 2022. The entirety of the above-mentioned patent application is hereby incorporated by reference herein and made a part of this specification.

BACKGROUND

Technical Field

The disclosure relates to a system, and in particular relates to a data-driven execution system and an execution method thereof.

Description of Related Art

In the field of enterprise management, enterprises may use message systems to illustrate the daily business activities of various functional personnel based on various forms of data and business logic. However, the current business logic and data are often scattered in various message systems, papers, or electronic forms, and the experience of various functional personnel. Moreover, the conventional business logic is only used for passive operations by users to assist manual data processing, rather than replacing the user. Therefore, there are actually still a large number of operations that need to be initiated by the user. In this regard, the main problem is that the conventional system has insufficient bearing capacity for knowledge. Since the complete enterprise process is very complex, there are many variables in the process of enterprise process execution which are difficult to be completely fixated into the system through conventional methods (such as process design), and still rely on the knowledge and experience of various functional personnel for further determination. In addition, another major problem is that it is difficult for conventional systems to flexibly meet business requirements in a low-cost manner. Due to the differences in the business processes of different enterprises, it is necessary to summarize a general business process with industry characteristics, and various types of business need to be able to be combined flexibly and replace different parts to satisfy the requirements of various business scenarios. In this regard, the above problems are difficult to overcome in the current conventional process engine or enterprise resource planning (ERP) system.

SUMMARY

According to an embodiment of the disclosure, a data-driven execution system includes a storage device and a processor. The storage device is used for storing multiple modules. The processor is coupled to the storage device and used to execute multiple modules. The processor receives a data processing request. The processor searches a data graph according to the data processing request to obtain at least one task path. The processor generates a recommended plan according to one of the at least one task path.

According to an embodiment of the disclosure, the data-driven execution method includes the following operation. A data processing request is received. A data graph is searched according to the data processing request to obtain at least one task path. A recommended plan is generated according to one of the at least one task path.

Based on the above, the data-driven execution system and the execution method thereof of the disclosure may automatically generate a recommended plan according to the data processing request.

In order to make the above-mentioned features and advantages of the disclosure comprehensible, embodiments accompanied with drawings are described in detail below.

DETAILED DESCRIPTION OF DISCLOSED EMBODIMENTS

References of the exemplary embodiments of the disclosure are to be made in detail. Examples of the exemplary embodiments are illustrated in the drawings. If applicable, the same reference numerals in the drawings and the descriptions indicate the same or similar parts.

Figure 1:
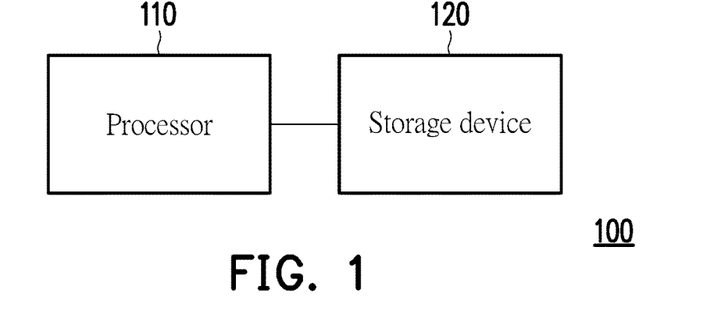
FIG. 1 is a circuit schematic diagram of an execution system of an embodiment of the disclosure.
Figure 2:
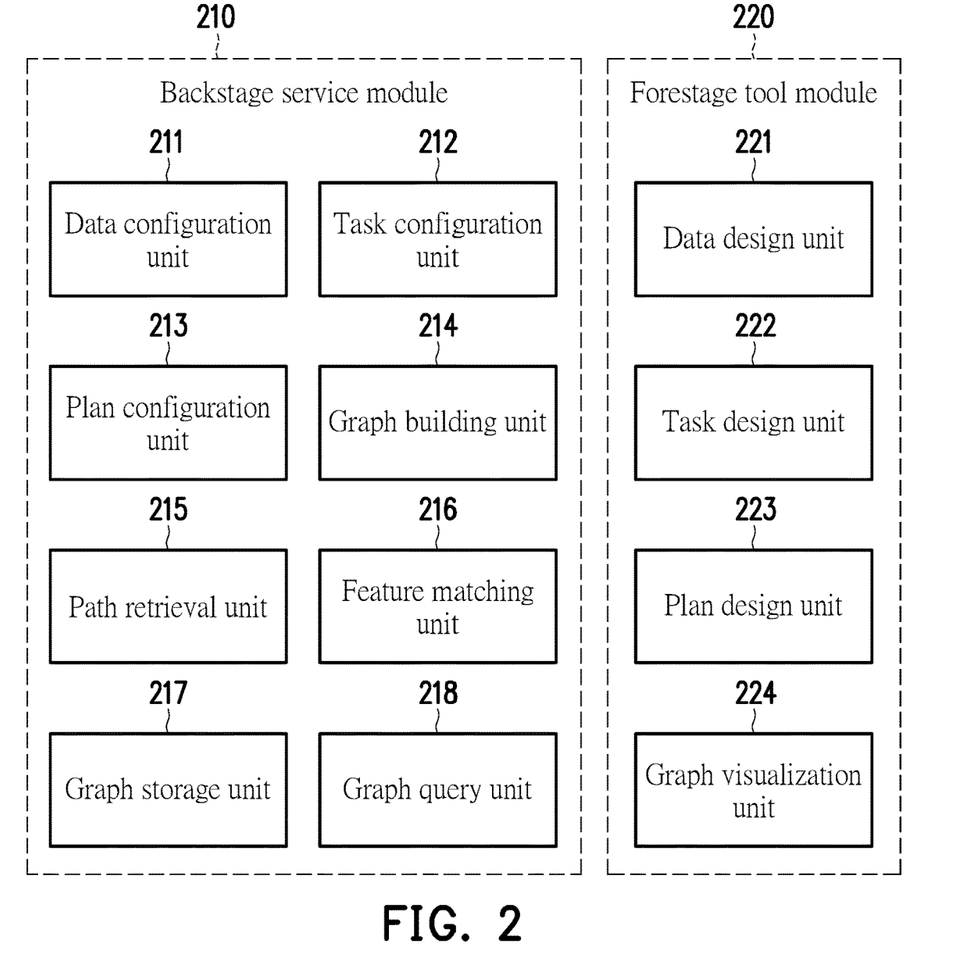
FIG. 2 is a schematic diagram of multiple modules and units according to an embodiment of the disclosure.

FIG. 1 is a circuit schematic diagram of an execution system of an embodiment of the disclosure. FIG. 2 is a schematic diagram of multiple modules and units according to an embodiment of the disclosure. Referring to FIG. 1 and FIG. 2, the execution system 100 includes a processor 110 and a storage device 120. In this embodiment, the processor 110 may include a processing circuit such as a central processing unit (CPU), a microprocessor control unit (MCU), or a field programmable gate array (FPGA), or a chip with data computing functions, but the disclosure is not limited thereto. The storage device 120 may be a memory, in which the memory may be a non-volatile memory such as a read only memory (ROM), an erasable programmable read only memory (EPROM), a volatile memory such as a random access memory (RAM), and storage devices such as a hard disc drive and a semiconductor memory, etc. The memory is used to store various modules, software, units, programs, data, and messages, etc., mentioned in the disclosure, for the processor 110 to read and execute. Alternatively, the processor 110 and the storage device 120 may also be formed by processing circuits and storage devices of multiple computing devices. It should be noted that the modules, engines, and units described in the various embodiments of the disclosure may be individually realized by corresponding one or more algorithms and/or software, and the relevant functions and operations described in the embodiments may be realized according to the execution results of one or more algorithms and/or software.

In one embodiment, the execution system 100 may also be, for example, set on a cloud server, for users (i.e., enterprises) or tenants (employees of the enterprise) to connect and execute the related business service function of the application programming interface (API) set in the cloud server, so as to operate automatic plan recommendation function of the execution system 100. The cloud server may be, for example, a software as a service (SaaS) server, and the API corresponds to the SaaS application, but the disclosure is not limited thereto. Alternatively, in another embodiment, the execution system 100 may be set in an enterprise resource planning (ERP) system operated by a local server in the enterprise, so as to provide an automatic plan recommendation function through a corresponding application programming interface.

In this embodiment, the storage device 120 may store the backstage service module 210 and the forestage tool module 220 as shown in FIG. 2, but the disclosure is not limited thereto. The backstage service module 210 includes a data configuration unit 211, a task configuration unit 212, a plan configuration unit 213, a graph building unit 214, a path retrieval unit 215, a feature matching unit 216, a graph storage unit 217, and a graph query unit 218. The forestage tool module 220 includes a data design unit 221, a task design unit 222, a plan design unit 223, and a graph visualization unit 224. In this embodiment, the backstage service module 210, the forestage tool module 220, and multiple units thereof may, for example, be respectively realized in programming languages such as JSON (JavaScript object notation), extensible markup language (XML) or YAML, but the disclosure is not limited thereto. In this embodiment, the processor 110 may read and execute these modules and units to realize the automatic plan recommendation function of the disclosure.

Figure 3:
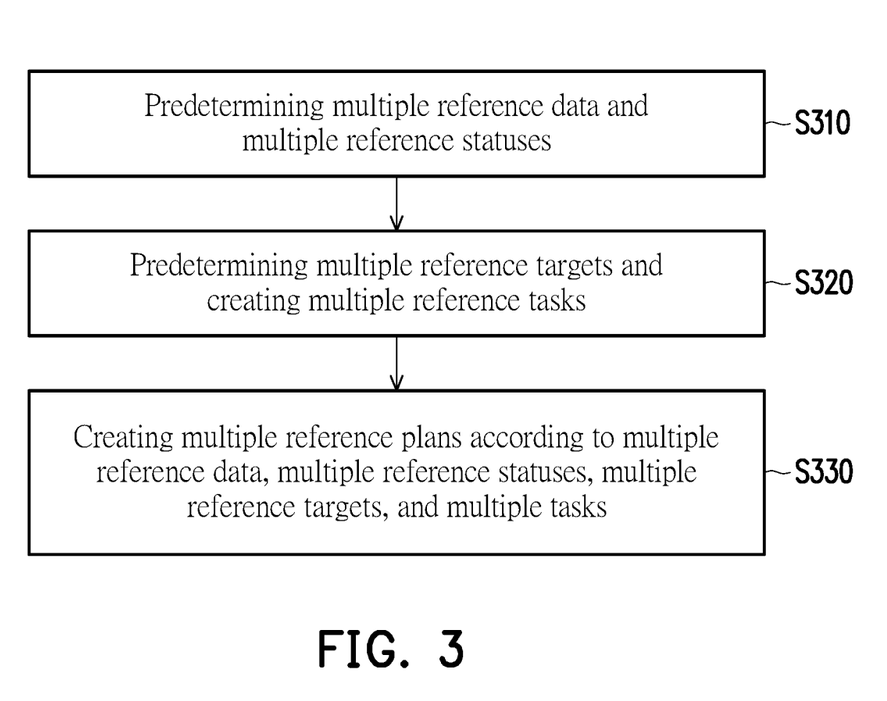
FIG. 3 is a flowchart of system settings of an embodiment of the disclosure.
Figure 4:
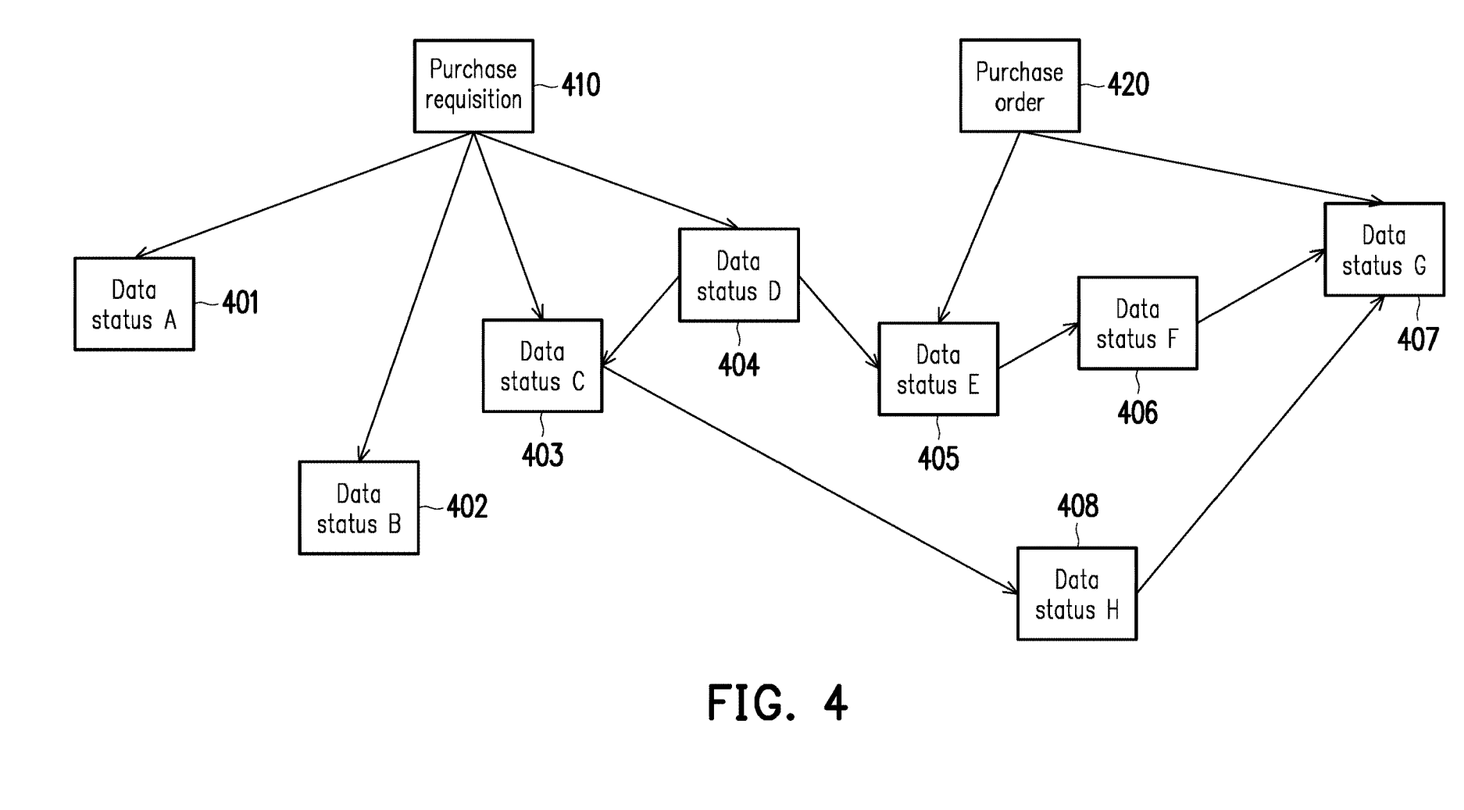
FIG. 4 is a schematic diagram of a data graph according to an embodiment of the disclosure.

FIG. 3 is a flowchart of system settings of an embodiment of the disclosure. FIG. 4 is a schematic diagram of a data graph according to an embodiment of the disclosure. Referring to FIG. 1 to FIG. 4, the execution system 100 may execute the following steps S310 to S330 to perform system settings in advance by users (the users generally refer to equipment suppliers, backstage personnel, enterprise users or tenants (employees)). In step S310, the processor 110 may predetermine multiple reference data and multiple reference statuses. In this embodiment, the user may preliminarily estimate the data type and data status that may be used in the relevant business process (enterprise process). The user may operate the data design unit 221 in the forestage tool module 220 through the user interface to execute the data configuration unit 211 of the backstage service module 210.

For example, the data configuration unit 211 may build an initial data graph of data 410 and 420 having data types including purchase requisition and purchase order, and data 401 to 408 having corresponding related data statuses A to H as shown in FIG. 4 according to the input command or settings of the user. The data graph may display the result of status flow, and may be displayed on the display screen of the user interface through the graph visualization unit 224 for the user to select and set. As shown in FIG. 4, the data 410 whose data type is a purchase requisition may correspond to the data 401 to 404 of data statuses A to D processed through the subsequent business logic, and the data 420 whose data type is a purchase order may correspond to the data 405 and 407 of the data statuses E and G processed through the subsequent business logic. Furthermore, the data 404 having the data status D may further flow to the data 403 having the data status C and the data 405 having the data status E. The data 403 having the data status C may further flow to the data 408 having the data status H. The data 405 having the data status E may further flow to the data 406 having the data status F. The data 406 having the data status F may further flow to the data 407 having the data status G. The data 408 having the data status H may further flow to the data 407 having the data status G. In this way, the execution system 100 may create in advance various possible data types, the possible statuses of each data type, and the flow relationship between data statuses of the entire business process (enterprise process) for use in subsequent queries.

In step S320, the processor 110 may predetermine multiple reference targets and create multiple reference tasks. In this embodiment, the user may predefine multiple targets, in which the targets may be used for the system to assign when a data event occurs. The user may operate the task design unit 222 in the forestage tool module 220 through the user interface to execute the task configuration unit 212 of the backstage service module 210 to create a task set. The user may directly use previously created tasks, or create new tasks to meet new business processing requirements.

In step S330, the processor 110 may create multiple reference plans according to multiple reference data, multiple reference statuses, multiple reference targets, and multiple tasks. In this embodiment, the user may create multiple realization plans of multiple targets predefined in the previous step, and create corresponding multiple steps according to the data graph to combine the corresponding tasks with the corresponding data statuses. In addition, the user may also add new data statuses and tasks according to usage scenarios or business requirements. The user may operate the plan design unit 223 in the forestage tool module 220 through the user interface to execute the plan configuration unit 213 of the backstage service module 210 for plan configuration, and may display the relevant configuration results on the display screen of the user interface through the graph visualization unit 224, so that the user or the execution system 100 may further build data instances and verify the plans.

It should be noted that the data types mentioned in the various embodiments of the disclosure refer to the data including multiple fields used to define the type of the data itself, and these fields may include different types of fields, different primary keys, and unique keys, and the disclosure is not limited thereto. Moreover, the same data type may have the same, similar, or different data structures, and the disclosure is not limited thereto. In addition, the data status mentioned in the various embodiments of the disclosure refers to a stable status definition given by the system to data including a series of data features, and this status definition may be applied to a data processing node in the data process, so that the system may redirect to this data processing node according to processing requirements during the data process.

Figure 5:
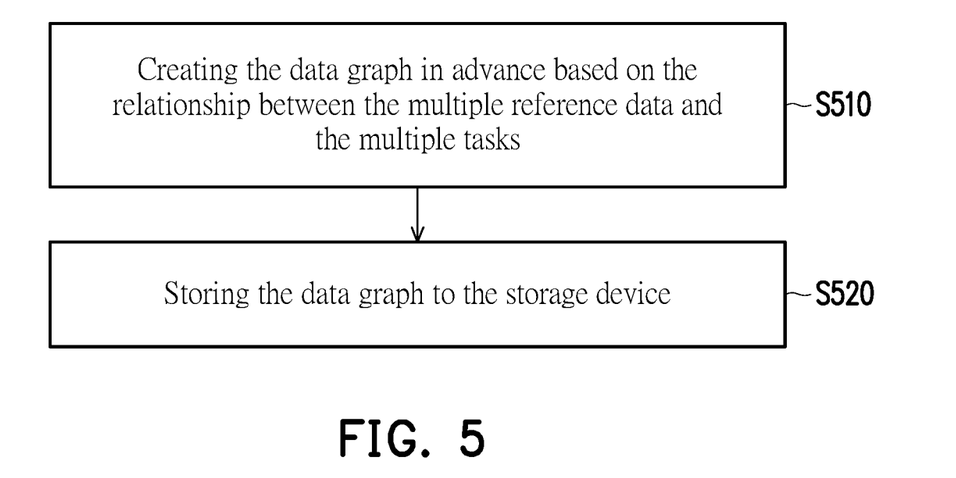
FIG. 5 is a flowchart of the system application of an embodiment of the disclosure.

FIG. 5 is a flowchart of the system application of an embodiment of the disclosure. Referring to FIG. 1 to FIG. 5, the execution system 100 may execute the following steps S510 to S520, so that the user may complete building the data graph in advance according to the corresponding application. In step S510, the processor 110 may create a data graph in advance based on the relationship between the multiple reference data and the multiple tasks. In step S520, the processor 110 may store the data graph into the storage device. In this embodiment, the graph building unit 214 may create a complete data graph based on the data model and according to the aforementioned configuration and design results, and save the data graph in a graph database or other storage media that may store graph data.

Figure 6A:
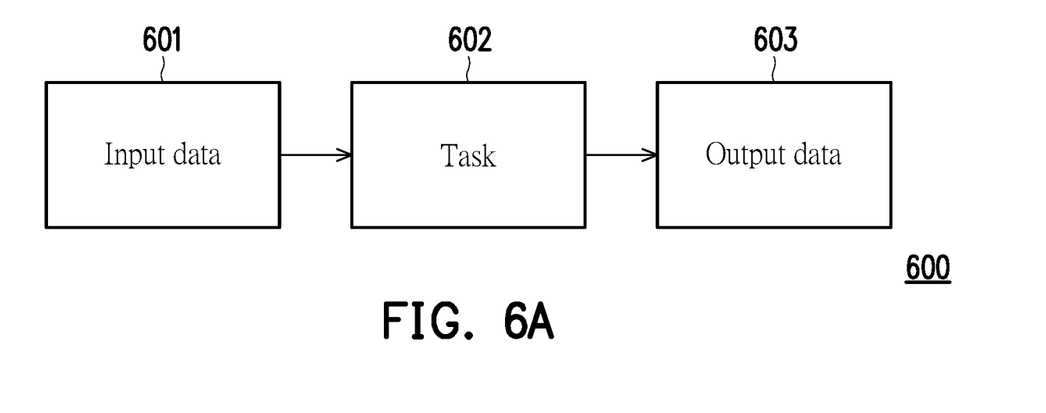
FIG. 6A is a schematic diagram of a data model according to an embodiment of the disclosure.

FIG. 6A is a schematic diagram of a data model according to an embodiment of the disclosure. Referring to FIG. 6A, the structure of the data model of the disclosure may be like the data model 600 shown in FIG. 6A. The data model 600 (data-task-data) is formed by corresponding input data 601, a corresponding task 602, and corresponding output data 603. In data model 600, the task 602 is used to process input data 601 having certain features, and then output data 603 of another data type or data feature. The output data 603 may be used as the input data for another or the next data model. The input data 601 and the output data 603 may be generalized as data entities. The task 602 may be generalized into a logical entity.

More specifically, task 602 is the smallest business logic unit in the data engine, and is responsible for specific business logic execution. The task 602 may process a certain type of data with a certain characteristic in a certain environment, and may output another type of data or data status. The task type of the task 602 may split the task according to different data processing dimensions. In this regard, the task 602 may be divided into, for example, a manual execution task and an automatic execution task according to the execution manner. The task 602 may be classified into, for example, an approval type, a reply type, and an abnormality removal type according to the business type. The task 602 may be divided into, for example, script, configuration, and internal process, etc. according to the realization manner. The realization of the task 602 may adopt a data platform mode. In this regard, the data platform may provide high-level packaging and abstraction for the task, and may provide an abstract interface to realize the specific business at the bottom level, pass context messages and various tools provided by the data platform to the task realization, and specify a fixed return model. The return model may include, for example, the returned status (the data platform performs different processing according to the returned status), the returned description message, the global process variables returned to the platform, and the returned data instance message (e.g., including one or more data types, data features, and data entities, etc.).

It should be noted that the data features mentioned in the various embodiments of the disclosure refer to a series of features extracted from the data entity itself, so that the system may process the data according to the corresponding processing rules.

Figure 6B:
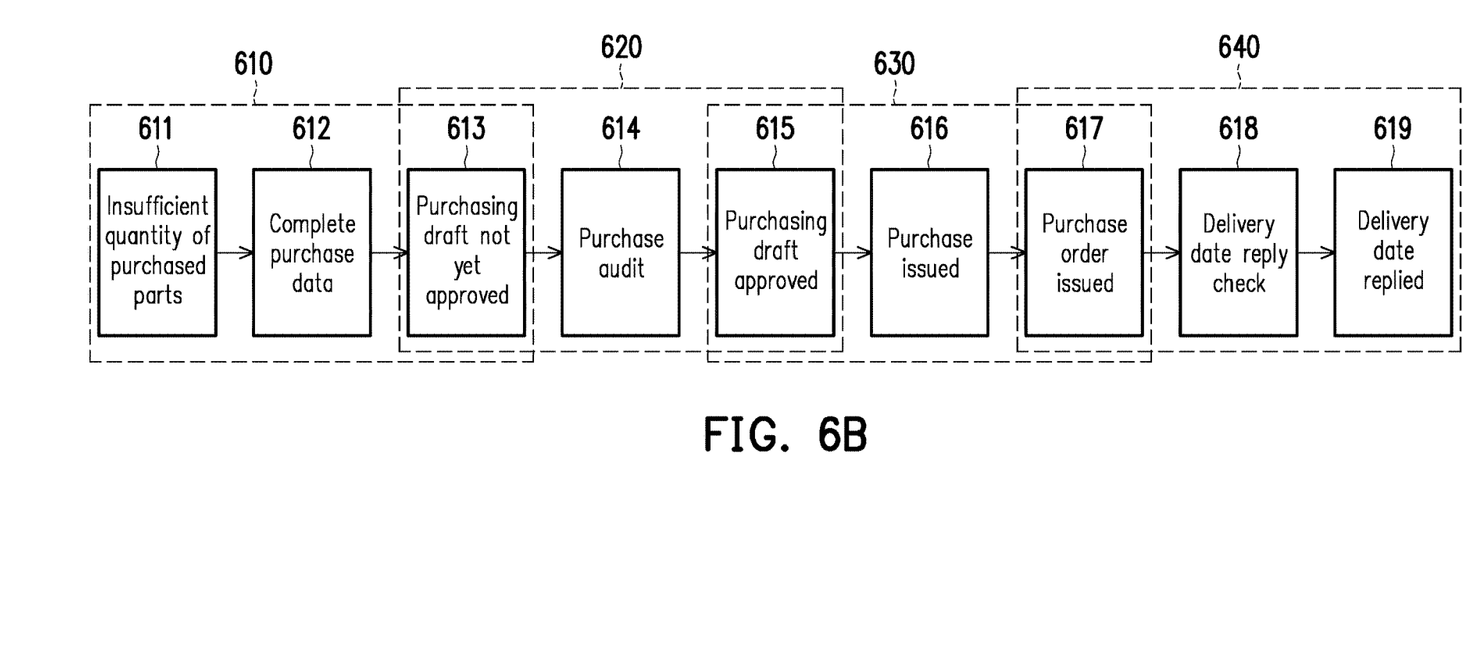
FIG. 6B is a schematic diagram of a task list according to an embodiment of the disclosure.

FIG. 6B is a schematic diagram of a task list according to an embodiment of the disclosure. Referring to FIG. 6B, for example, multiple data models 610 to 640 may form a task path as shown in FIG. 6B. From another perspective, the task path is a task list formed by multiple data models 610 to 640. As shown in FIG. 6B, the data model 610 includes the data 611 of insufficient quantity of purchased parts, the task 612 of completing the purchase data, and the data 613 of purchasing draft not yet approved. The data 611 of insufficient quantity of purchased parts is input into the task 612 of completing the purchase data, and after calculating or data processing the task 612 of completing the purchase data by the logical entity, the data 613 of purchasing draft not yet approved may be generated. The data 613 of purchasing draft not yet approved subsequently serves as the input data of the data model 620. The data model 620 includes data 613 of purchasing draft not yet approved, tasks 614 of purchase internal audit, and data 615 of purchasing draft approved. The data 613 of purchasing draft not yet approved is input into the task 614 of the purchase internal audit, and after calculating or data processing of the task 614 of purchase internal audit by the logical entities, the data 615 of purchasing draft approved may be generated. The data 615 of purchasing draft approved subsequently serves as the input data of the data model 630. The data model 630 includes the data 615 of purchasing draft approved, the task 616 of purchase issued, and the data 617 of purchase order issued. The data 615 of purchasing draft approved is input into the task 616 of purchase issued, and after calculating or data processing the task 616 of purchase issued by the logical entity, the data 617 of purchase order issued may be generated. The data 617 of purchase order issued subsequently serves as the input data of the data model 640. The data model 640 includes the data 617 of purchase order issued, the task 618 of delivery date reply check, and the data 619 of delivery date replied. The data 617 of purchase order issued is input into the task 618 of delivery date reply check, and after calculating or data processing the task 618 of delivery date reply check by the logical entity, the data 619 of delivery date replied may be generated. In other words, the graph building unit 214 can, for example, further build the task path as shown in FIG. 6B for the data 420 having the data type as a purchase order and its associated data status in FIG. 4 based on the aforementioned configuration and design and based on the data model structure shown in FIG. 6A. The graph building unit 214 may similarly further create other multiple task paths according to different reference targets and different reference plans.

Figure 7:
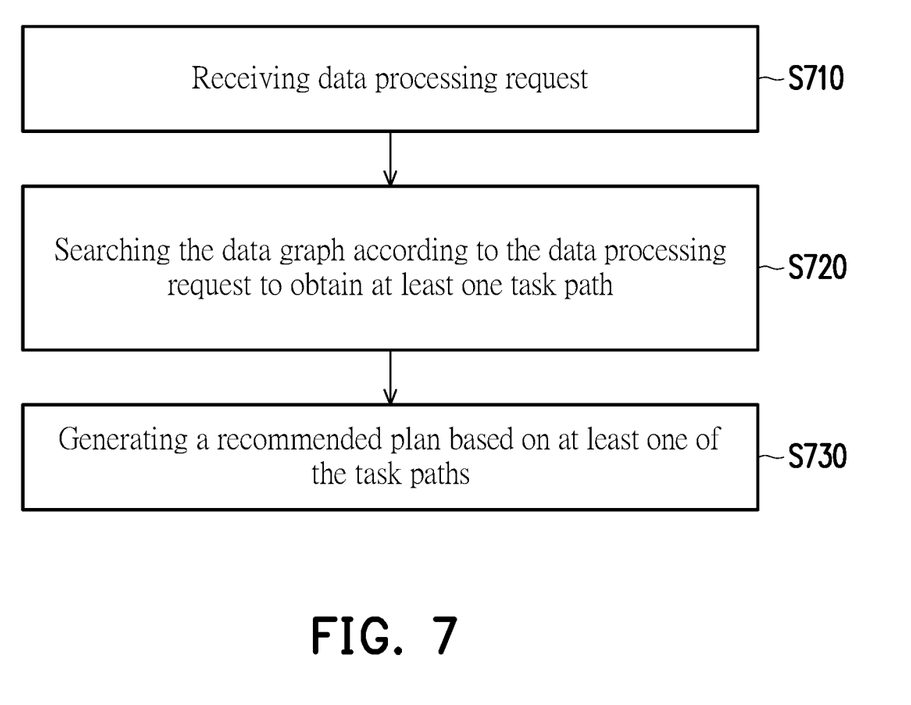
FIG. 7 is a flowchart of an execution method according to an embodiment of the disclosure.

FIG. 7 is a flowchart of an execution method according to an embodiment of the disclosure. Referring to FIG. 1, FIG. 2, and FIG. 7, the execution system 100 may execute the following steps S710 to S730 to realize the automatic plan recommendation function. In step S710, the processor 110 may receive a data processing request. In this embodiment, the data processing request means that the processor 110 may receive initial data input by the user or automatically detected by the system when data changes occur. The data processing request may include the current data status and the target data status. The processor 110 may execute the path retrieval unit 215 and perform data packaging on the initial data of the data processing request to generate a data instance.

In step S720, the processor 110 may search the data graph according to the data processing request to obtain at least one task path. In this embodiment, the processor 110 may search the data graph according to the data instance and the target to realize of the data processing request to obtain at least one task path. In this regard, the processor 110 may execute the graph query unit 218 to use the aforementioned data instance as the starting point of the path and the aforementioned data status of the target as the ending point of the path. The graph query unit 218 may use a graph algorithm to query a previously created data graph to find at least one task path (reachable path).

In step S730, the processor 110 may generate a recommended plan according to one of the at least one task path. In this embodiment, the processor 110 may execute the feature matching unit 216 to determine the matching degree of the data feature with the task feature of the aforementioned at least one task path based on the current data status of the request according to the feature matching algorithm, thereby selecting the task path with a high matching degree to generate the recommended plan. The processor 110 may, for example, separately calculate multiple data conditions of multiple data of each task path to obtain multiple matching scores, and sum up the matching scores to obtain a matching degree of each task path. In another embodiment, the processor 110 may also filter out the best plan according to the data features, environment message and/or other supplementary message of each data in each task path.

In an embodiment, the task path used for the recommended plan may have the shortest execution path, the shortest execution time, or the highest recommended degree, etc., but the disclosure is not limited thereto. In another embodiment, when multiple task paths have the same matching degree, the processor 110 may further select one of the multiple task paths according to a preset rule to generate the recommended plan. The preset rule may be, for example, a specific recommended plan preset for a specific current data status or a specific target to realize, or a specific recommended plan determined according to a previous user operation history.

Figure 8:
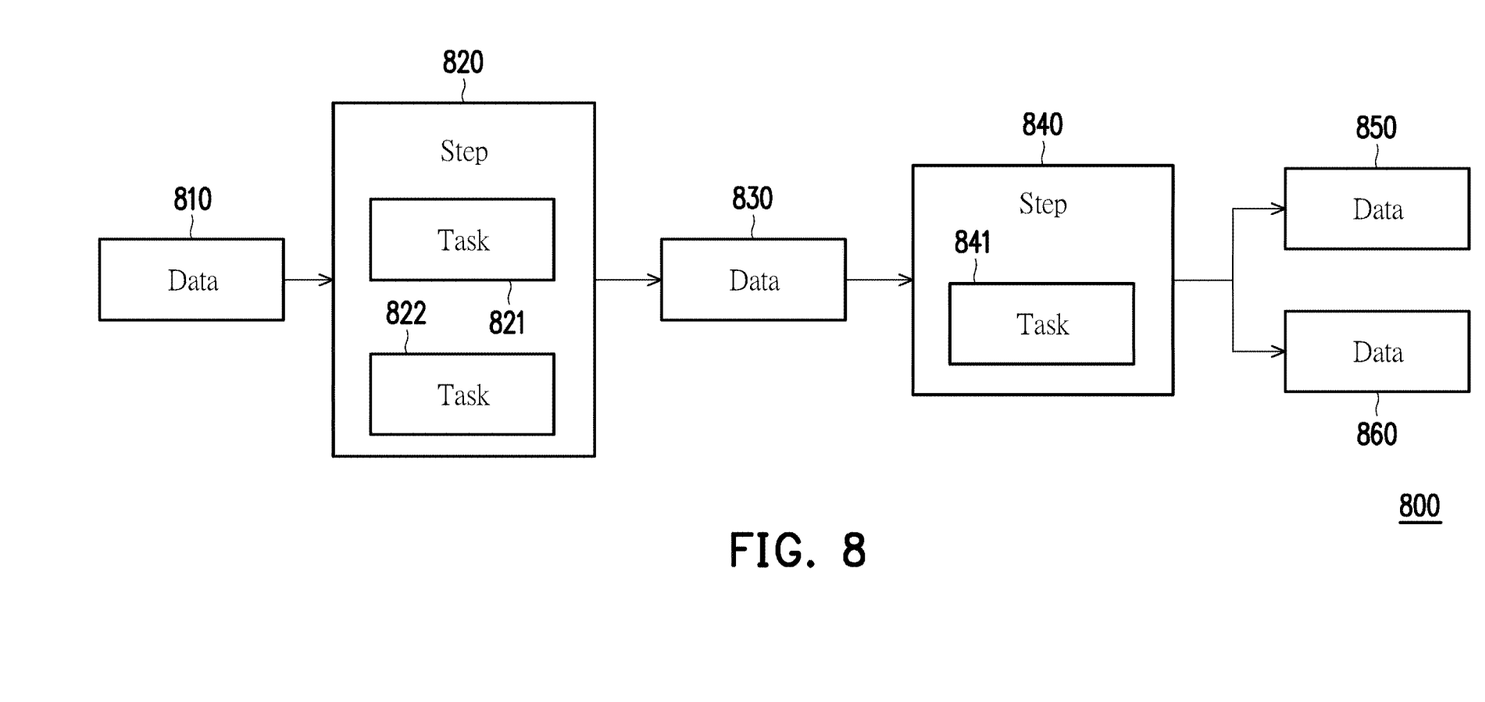
FIG. 8 is a schematic diagram of a recommended plan according to an embodiment of the disclosure.

FIG. 8 is a schematic diagram of a recommended plan according to an embodiment of the disclosure. Referring to FIG. 1, FIG. 2, and FIG. 8, the recommended plan of the disclosure may have a task path of plan 800 as shown in FIG. 8. It should be noted first that the plan 800 may be, for example, a complete execution process, and is a target to realize that may realize the data processing request. The plan 800 is realized with reference to a data model and a previously built data graph. The plan 800 may be formed by multiple steps. In this regard, step 820 and step 840 may respectively be used to complete a staged target (i.e., a certain data status in the data graph). In this embodiment, step 820 and step 840 may be respectively formed by one or more unordered tasks, and step 820 and step 840 may respectively bear the output of each task.

In this embodiment, the processor 110 may perform data packaging on the initial data of the data processing request to obtain data 810 having a certain data status, and search the data graph to obtain the task path as shown in FIG. 8. The data 810 may be used as the input data of the task 821 and the task 822. The data 810 may be processed by the logical entities of the task 821 and the task 822 in step 820 to generate the data 830 having another data status. The data 830 may be used as the input data of the task 841. The data 830 may be processed by the logical entity of the task 841 in step 840 to generate the data 850 and the data 860 having different data statuses.

For example, the user may input data 810 having a data type of a purchase requisition and a data processing request with a target to realize of a purchase order to the execution system 100. The execution system 100 may automatically perform task path retrieval to obtain a recommended plan having a task path as shown in FIG. 8. The graph visualization unit 224 may display the recommended plan to the user, so that the user may determine whether to execute the plan, so that the execution system 100 may execute relevant steps and tasks to generate two purchase order data, e.g., data 850 and data 860, to the user according to the task path shown in FIG. 8.

In addition, it should be noted that, on the basis of the data graph structure, there may also be data transfer between multiple task paths (i.e., multiple plans) generated by the execution system 100. For example, the task 822 may generate data for another plan, or the data 830 may also be executed by a task in another plan. In addition, the data in the task path generated by the execution system 100 may also be generated by executing a sub-plan in another plan. For example, data 830 may first be provided to tasks of a sub-plan in another plan, and data 860 is generated by tasks of a sub-plan in another plan.

Figure 9:
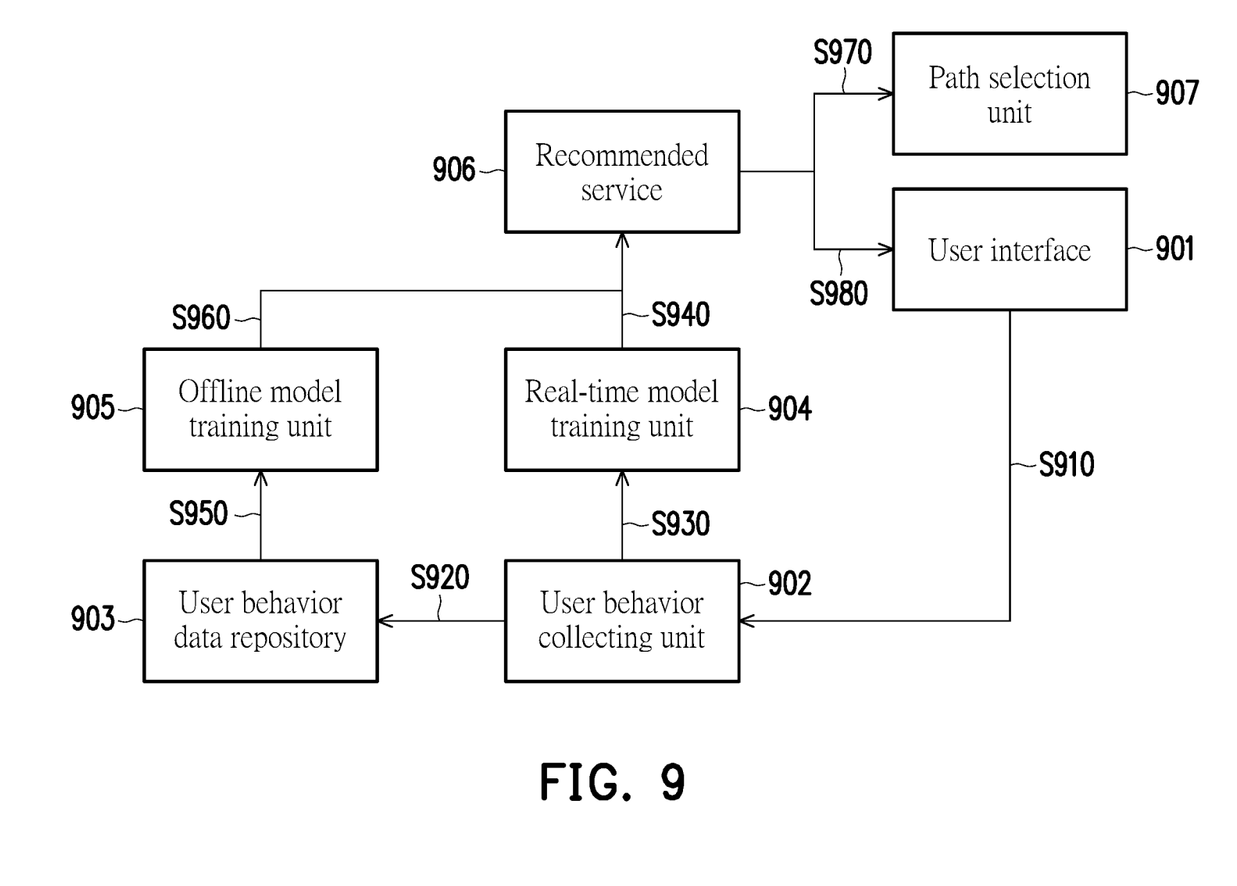
FIG. 9 is a flowchart of an execution method according to another embodiment of the disclosure.

FIG. 9 is a flowchart of an execution method according to another embodiment of the disclosure. Referring to FIG. 1, FIG. 2, and FIG. 9, in this embodiment, in step S730 of FIG. 7 above, the processor 110 may also generate a real-time model according to the path selection command provided by the user interface, and the processor 110 may generate a recommended plan according to the real-time model and the pre-stored offline model. In this embodiment, the backstage service module 210 and the forestage tool module 220 stored in the storage device 120 may further store relevant modules and algorithm of the user interface 901, the user behavior collecting unit 902, the user behavior data repository 903, the real-time model training unit 904, the offline model training unit 905, the recommendation service 906 and the path selection unit 907 as shown in FIG. 9, and execute the following steps S910 to S980 (i.e., another realization manner of step S730). In step S910, when there are multiple task paths, the user interface 901 may generate a path selection command according to the operation of the user, and the user behavior collecting unit 902 may collect the path selection command. In step S920, the user behavior data repository 903 may store the path selection command and the related operation behavior of the user. In step S930, the real-time model training unit 904 may obtain the path selection command and the related operation behavior of the user from the user behavior collecting unit 902, and generate a real-time model. In step S940, the real-time model training unit 904 may provide the trained real-time model to the recommendation service 906. In step S950, the offline model training unit 905 may obtain multiple historical related operation behaviors of the user from the user behavior collecting unit 902 and generate an offline model. In step S960, the offline model training unit 905 may provide the trained offline model to the recommendation service 906. In step S970, the recommendation service 906 may generate a recommended result according to the real-time model and the offline model, and provide the recommended result to the path selection unit 907 so that the path selection unit 907 may perform automatic path selection. In step S980, the recommendation service 906 may generate a recommended result according to the real-time model and the offline model, and provide the recommended result to the user interface 901 as a reference for user selection. In one embodiment, the real-time model may be adjusted through means such as user modification or offline simulation to generate a final execution plan, so that the final execution plan may be directly used subsequently. Alternatively, the real-time model may also refer to plans modified by the user or generated by the offline simulation during the process of generating the recommended result.

Figure 10:
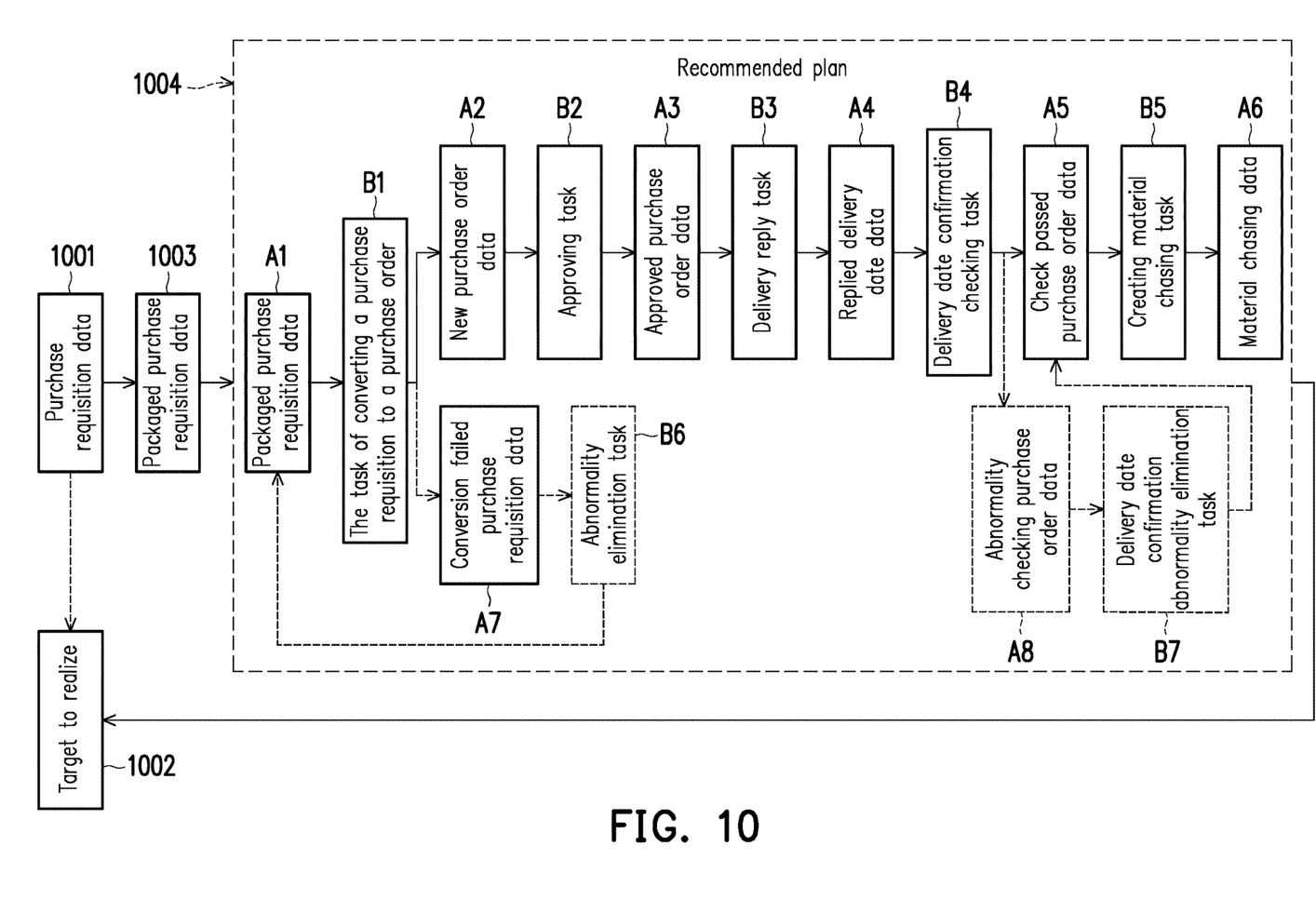
FIG. 10 is a schematic diagram of a recommended plan according to another embodiment of the disclosure.

FIG. 10 is a schematic diagram of a recommended plan according to another embodiment of the disclosure. Referring to FIG. 1, FIG. 2, and FIG. 10, the processor 110 may initiate a data processing request according to the initial data input by the user or automatically detected by the system when data changes occur. Taking the purchase requisition data 1001 as the initial data and the target to realize 1002 as the material chasing data as an example, the processor 110 may first package the purchase requisition data 1001 to generate packaged purchase requisition data 1003. Next, the processor 110 may execute the path retrieval as described in the above embodiments to generate the recommended plan 1004. In the recommended plan 1004, the packaged purchase requisition data A1 may be used as the input data of the task B1 of converting the purchase requisition to the purchase order, and the task B1 of converting the purchase requisition to the purchase order may output the new purchase order data A2 or the conversion failed purchase requisition data A7. The new purchase order data A2 may be used as the input data of the approving task B2, and the approving task B2 may output the approved purchase order data A3. The approved purchase order data A3 may be used as the input data of the delivery reply task B3, and the delivery reply task B3 may output the replied delivery date data A4. The replied delivery data A4 may be used as the input data of the delivery date confirmation checking task B4, and the delivery date confirmation checking task B4 may output the check passed purchase order data A5 or the abnormality checking purchase order data A8. The check passed purchase order data A5 may be used as the input data of the creating material chasing task B5, and the creating material chasing task B5 may output the material chasing data A6. Accordingly, the recommended plan 1004 may complete the target to realize 1002. In addition, the conversion failed purchase requisition data A7 may be used as the input data of the abnormality elimination task B6, and the purchase requisition data A1 of the new package may be generated, and the task B1 of converting a purchase requisition to a purchase order may be re-executed. The abnormality checking purchase order data A8 may be used as the input data of the delivery date confirmation abnormality elimination task B7, and the check passed purchase order data A5 may be generated.

Therefore, the execution system 100 may effectively and automatically generate the recommended plan 1004 for user reference or automatically complete the target to realize 1002. Moreover, during the execution of the task path of the recommended plan 1004, the execution system 100 may also effectively eliminate the problem of abnormal data according to the manual operation of the user or automatic execution of relevant task logic.

To sum up, in order to break through the limitations of conventional systems in realizing business logic, the execution system and execution method based on data model of the disclosure provide a method to automatically process or prompt various tasks that need to be completed for the user based on changing data from a data perspective. Different tasks to be completed and their combinations may be selected according to different data types and the environment at the time. Therefore, the execution system and execution method of the disclosure may have high inclusiveness and scalability for business logic in various scenarios in various fields, and provide more convenient customization capabilities for various enterprises and regions.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments may still be modified, or parts or all of the technical features thereof may be equivalently replaced; however, these modifications or substitutions do not deviate the essence of the corresponding technical solutions from the scope of the technical solutions of the embodiments of the disclosure.

What is claimed is:

1. A data-driven execution system, comprising:
a storage device, used to store a plurality of modules; and
a processor, coupled to the storage device and used to execute the modules,
wherein the processor receives a data processing request, and the processor searches a data graph according to the data processing request to obtain at least one task path,
wherein the processor generates a recommended plan according to one of the at least one task path,
wherein the processor determines a matching degree of a data feature and the at least one task path based on a current data status of the data processing request to select a task path with a highest matching degree, and the processor generates the recommended plan according to the task path with the highest matching degree,
wherein the processor separately calculates a plurality of data conditions of each of the at least one task path to obtain a plurality of matching scores, and sums up the matching scores to obtain the matching degree of each of the at least one task path.

2. The data-driven execution system according to claim 1, wherein the at least one task path is a task list built from a plurality of data models, and each of the data models is formed by corresponding input data, a corresponding task, and corresponding output data.

3. The data-driven execution system according to claim 1, wherein the processor performs data packaging on initial data of the data processing request to generate a data instance; and the processor searches the data graph according to the data instance and a target to realize of the data processing request to obtain the at least one task path.

4. The data-driven execution system according to claim 1, wherein the processor selects one of a plurality of task paths according to a preset rule to generate the recommended plan when the plurality of task paths have matching degrees that are the same.

5. The data-driven execution system according to claim 1, wherein the processor generates a real-time model according to a path selection command provided by a user interface, and the processor generates the recommended plan according to the real-time model and a pre-stored offline model.

6. The data-driven execution system according to claim 1, wherein the one of the at least one task paths used to generate the recommended plan has a shortest execution path, a shortest execution time, or a highest recommendation degree.

7. The data-driven execution system according to claim 1, wherein the processor predetermines a plurality of reference data and a plurality of reference statuses, and predetermines a plurality of reference targets and creates a plurality of reference tasks, wherein the processor creates a plurality of reference plans according to the reference data, the reference statuses, the reference targets, and the reference tasks, wherein the processor selects one of the reference plans for generating the recommended plan.

8. The data-driven execution system according to claim 7, wherein the processor creates the data graph in advance based on a relationship between the reference data and the reference tasks, and stores the data graph into the storage device.

9. A data-driven execution method, comprising:
receiving a data processing request;
searching a data graph according to the data processing request to obtain at least one task path; and
generating a recommended plan according to one of the at least one task path,
wherein generating the recommended plan comprises:
determining a matching degree of a data feature and the at least one task path based on a current data status of the data processing request to select a task path with a highest matching degree; and generating the recommended plan according to the task path with the highest matching degree, wherein generating the recommended plan further comprises:

separately calculating a plurality of data conditions of each of the at least one task path to obtain a plurality of matching scores, and summing up the matching scores to obtain the matching degree of each of the at least one task path.

10. The data-driven execution method according to claim 9, wherein generating the recommended plan further comprises:

selecting one of a plurality of task paths according to a preset rule to generate the recommended plan when the plurality of task paths have matching degrees that are the same.

11. The data-driven execution method according to claim 9, wherein the at least one task path is a task list built from a plurality of data models, and each of the data models is formed by corresponding input data, a corresponding task, and corresponding output data.

12. The data-driven execution method according to claim 9, wherein obtaining the at least one task path comprises:

performing data packaging on initial data of the data processing request to generate a data instance; and searching the data graph according to the data instance and a target to realize of the data processing request to obtain the at least one task path.

13. The data-driven execution method according to claim 9, wherein generating the recommended plan comprises:

generating a real-time model according to a path selection command provided by a user interface; and generating the recommended plan according to the real-time model and a pre-stored offline model.

14. The data-driven execution method according to claim 9, wherein the one of the at least one task paths used to generate the recommended plan has a shortest execution path, a shortest execution time, or a highest recommendation degree.

15. The data-driven execution method according to claim 9, further comprising:

predetermining a plurality of reference data and a plurality of reference statuses;

predetermines a plurality of reference targets and creating a plurality of reference tasks;

creating a plurality of reference plans according to the reference data, the reference statuses, the reference targets, and the reference tasks; and selecting one of the reference plans for generating the recommended plan.

16. The data-driven execution method according to claim 15, further comprising:

creating the data graph in advance based on a relationship between the reference data and the reference tasks; and storing the data graph into the storage device.

* * * * *